United States Patent [19]

Nichols

[11] Patent Number: 4,882,081

[45] Date of Patent: Nov. 21, 1989

[54] COMPOSITIONS OF WATER-DISPERSED CARBOXYL-CONTAINING LIQUID POLYMERS

[75] Inventor: Carl S. Nichols, Pineville, N.C.

[73] Assignee: The BF Goodrich Company, Akron, Ohio

[21] Appl. No.: 134,412

[22] Filed: Dec. 17, 1987

[51] Int. Cl.$^4$ .................................................. C09K 3/00
[52] U.S. Cl. .............................. 292/182.28; 524/556; 524/853
[58] Field of Search .................... 252/182.28; 524/556, 524/853

[56] References Cited

U.S. PATENT DOCUMENTS

| | | | |
|---|---|---|---|
| 2,201,395 | 3/1940 | Fletcher | 524/853 |
| 4,119,592 | 10/1978 | Murphy | 525/530 |
| 4,251,415 | 2/1981 | Nakada et al. | 524/901 |
| 4,533,694 | 8/1985 | Elton et al. | 524/556 |
| 4,581,402 | 4/1986 | Dunk et al. | 524/755 |
| 4,661,550 | 4/1987 | Zychowski | 524/853 |
| 4,670,505 | 6/1987 | Craig | 524/755 |
| 4,771,100 | 9/1988 | Das et al. | 524/853 |

OTHER PUBLICATIONS

Hawley, "Condensed Chemical Dictionary", 9th Ed., p. 174, Van Nostrand Reinhold Co., (1977), N.Y.

*Primary Examiner*—Edward A. Miller
*Attorney, Agent, or Firm*—Nestor W. Shust; Debra L. Pawl

[57] ABSTRACT

Novel liquid polymer water-dispersed compositions are prepared containing (1) 100 parts by weight of a carboxyl-containing liquid polymer, (2) at least 25 parts by weight of a solvent which is soluble in both water and oganics and has a boiling point above about 100° C., (3) at least about 0.8 equivalent of a base having a $pk_a$ value of greater than 7, and (4) from about 50 to about 750 parts by weight of water. The compositions are useful as a component in water-borne resin systems such as epoxies and polyesters.

8 Claims, No Drawings

COMPOSITIONS OF WATER-DISPERSED CARBOXYL-CONTAINING LIQUID POLYMERS

BACKGROUND

This invention relates to new compositions of water-dispersed, carboxyl-containing reactive liquid polymers. Liquid polymers containing carboxyl groups are known in the art. For example, U.S. Pat. No. 3,285,949 describes carboxyl-terminated liquid polymers having a polymeric backbone comprising carbon-carbon linkages prepared by polymerizing dienes with or without vinyl nitriles in the presence of a bis-azocyanoacid initiator. Other carboxyl-containing liquid polymers having carbon-carbon linkage backbones and their uses are described in U.S. Pat. No. 4,119,592. Carboxyl-containing liquid polymers can also be prepared using the process described in U.S. Pat. No. 3,135,716 wherein monomers are polymerized using an organo-polyalkali metal compound to yield a polymer having a terminal alkali metal, and then post-reacting the polymer to form a terminal carboxyl group. The B.F. Goodrich Company markets a line of carboxyl-containing polymers containing carbon-carbon backbone linkages under the trademark Hycar ® RLP.

Carboxyl-containing liquid polymers are useful as components in castable elastomeric systems, as tougheners for epoxy and polyester resins in structural plastics, and in paints, coatings, sealants, adhesives, and the like.

These carboxyl-containing liquid polymers have, heretofore, been used primarily in their liquid form or in the form of solvent solutions. However, in many applications such as in paints, coatings, sealants, and adhesives, it would be advantageous that the polymers be in the form of water-dispersion. A method that can be used to convert carboxyl-containing liquid polymers to water-dispersed compositions involves adding the polymer to a mixture of water and a high level of soap using a high speed mixer such as an Eppenbach homogenizer or a Minisonic homogenizer and agitating the mixture under high shear. Such processes require equipment and time to perform, introduce high levels of soap into the final composition, and have not resulted in completely satisfactory water-dispersed compositions.

SUMMARY OF THE INVENTION

Water dispersed, carboxyl-containing liquid polymer compositions are readily prepared which comprise a mixture of:

(1) 100 parts by weight of a carboxyl-containing liquid polymer, (2) at least about 25 parts by weight of an organic solvent which is both water and organic soluble and has a normal boiling point above about 100° C.;

(3) at least about 0.8 equivalent of base for each 1.0 carboxyl equivalent, said base having a $pk_a$ value of greater than about 7; and (4) from about 50 to about 750 parts of water.

DETAILED DESCRIPTION

Carboxyl-containing liquid polymers which are suitable for use in this invention can be represented by the following general formula:

$Y_n$—B—X wherein Y is a univalent carboxyl radical; n is an integer from 1 to about 10; X is either Y or a monomeric unit of the polymeric backbone; and B is a polymeric backbone comprising carbon-carbon linkages. Generally, the polymeric backbone linkages comprise at least about 70% by weight and more typically at least about 90% by weight of the total polymer, and the carboxyl groups comprise from a minimum of about 0.5% to about 10% or more by weight of the total polymer. The liquid polymer can contain pendant carboxyl groups in addition to or in place of terminal carboxyl groups.

Carboxyl-containing liquid polymers such as referenced above are known. Examples of such polymers having polymeric backbones comprising carbon-carbon linkages are described in U.S. Pat. No. 3,285,949, which description is hereby incorporated by reference. Such polymers are further described in U.S. Pat. No. 4,119,592. These polymers are readily prepared by the reaction of vinylidene-containing monomers in the presence of a bis-azocyano acid such as azodicyanovaleric acid or by other methods adequately described in U.S. Pat. No. 3,135,716. The method of preparing the carboxyl-containing liquid polymer is not critical to this invention. Any carboxyl-containing liquid polymers meeting the specifications stated herein can be formed into the water-dispersed compositions of the invention using the method disclosed herein.

The more preferred carboxyl-containing liquid polymers are referred to as carboxyl-terminated liquid polymers wherein the polymer has an average molecular weight of from about 200 to about 10,000; and has a Brookfield viscosity (measured using a Brookfield RVT viscometer at 27° C. with spindle No. 7 at about 20 rpm) of from about 1000 cps to about 2,500,000 cps, and more preferably from about 5000 cps to about 500,000 cps.

The carboxyl-containing liquid polymers can have pendant carboxyl groups (i.e., carboxyl groups which are attached to the polymeric backbone as side groups) and/or terminal carboxyl groups (i.e., carboxyl groups which are attached to the ends of the polymeric backbone). The carboxyl-terminated liquid polymers can be mono-functional; i.e. having a carboxyl group at one terminal end of the molecule, or di-functional; i.e. having a carboxyl group at each terminal end of the molecule. Also, the mono-functional or di-functional polymer can contain pendant carboxyl groups. Hence, the total carboxyl functionality of the more preferred carboxyl-terminated liquid polymers can range from 1 to about 10 or more, but more preferably ranges from 1 to about 3 carboxyl groups per molecule.

The most preferred carboxyl-containing liquid polymers are the carboxyl-terminated liquid polymers which have polymeric backbones comprised of carbon-carbon linkages derived from polymerized units of at least one vinylidene monomer having at least one terminal $CH_2$=group. Examples of such vinylidene monomers are (a) monoolefins containing 2 to 14 carbon atoms, more preferably 2 to 8 carbon atoms, such as ethylene, propylene, isobutylene, 1-butene, 1-pentene, 1-hexene, 1-heptene, and the like; (b) dienes containing 4 to 10 carbon atoms, more preferably 4 to 8 carbon atoms, such as butadiene, isoprene (2-methyl-1,3-butadiene), 2-isopropyl-1,1,3-butadiene, chloroprene (2-chloro-,3-butadiene), and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like, and (e) acrylates having the formula

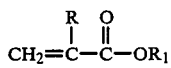

wherein R is hydrogen or an alkyl radical containing 1 to 3 carbon atoms, such as methyl, ethyl, propyl, and isopropyl, and $R^1$ is an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, heylthioethyl acrylate, α-cyanoethyl acrylate, cyanooctyl acrylate, methyl methacrylate, ethyl methacrylate, octyl methacrylate, and the like. Often two or more types of these polymerized monomeric units are contained in the polymeric backbone.

The vinylidene monomers described above may be polymerized readily with up to about 50% by weight and more preferably up to about 35% by weight of at least one comonomer selected from the group consisting of (f) vinyl aromatics having the formula

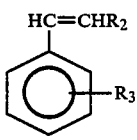

wherein $R_2$ is hydrogen or methyl and $R_3$ is hydrogen, halogen or an alkyl radical containing from to 4 carbon atoms, such as styrene, α-methyl styrene, chlorostyrene, vinyl toluene, and the like; (g) vinyl nitriles having the formula

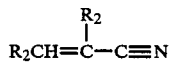

such as acrylonitrile and methacrylonitrile; (h) vinyl halides such as vinyl bromide, vinyl chloride, and the like; (i) vinyl acids such as acrylic acid, methacrylic acid, and itaconic acid; (j) divinyls and diacrylates such as divinyl benzene, divinyl ether, diethylene glycol diacrylate, and the like; (k) amines of α,β-olefinically unsaturated carboxylic acids containing 2 to 8 carbon atoms such as acrylamide, and the like; and (l) allyl alcohol, and the like. Liquid polymer compositions having polymeric backbone derived from polymerized units of a major amount of at least one vinylidene monomer listed in (a) to (e) with a minor amount of at least one comonomer listed in (f) to (l) are within the scope of this invention.

Examples of useful interpolymerized polymeric backbones of carbon-carbon linkages include polyethylene, polyisobutylene, polyisoprene, polybutadiene, poly(vinyl ethyl ether), poly(ethylacrylate) and poly (butylacrylate) as well as polymers of butadiene and acrylonitrile; butadiene and styrene; butadiene, acrylonitrile, and acrylic acid; vinyl acetate and isoprene; vinyl acetate and chloroprene; methyl acrylate and butadiene; methyl acrylate and ethyl acrylate; methyl acrylate and butyl acrylate; methyl acrylate and 2-ethylhexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and 2-ethylhexyl acrylate; ethyl acrylate and acrylic acid; ethyl acrylate and acrylamide; butyl acrylate and styrene; butyl acrylate and acrylonitrile; butyl acrylate and vinyl chloride, and the like.

The most preferred liquid carboxylterminated polymers are the carboxyl-terminated copolymers having polymeric backbones comprised of carbon-carbon linkages derived from interpolymerized units of from about 50% to about 99.6% by weight of a diene such as isoprene or butadiene, and up to about 40% by weight of a vinyl nitrile such as acrylonitrile or a vinyl aromatic such as styrene, and up to 10% by weight of a vinyl acid such as acrylic acid, and having a carboxyl content of from about 0.4% to about 10% by weight, all weights based upon the total weight of the polymer. These polymers have an average molecular weight of from about 1000 to about 5000, and a viscosity of from about 1000 to about 500,000 centipoises (measured at 27° C. using a Brookfield RVT viscometer with spindle no. 7 at 20 rpm).

Another essential ingredient in the composition of this invention is the solvent. The solvent requires the unusual property of being both water and organic soluble and having a relatively high boiling point of greater than about 100° C. Examples of solvents having the above described properties include the glycol ethers such as 1-methoxy-2-methyl ethanol, 2-propoxyethanol and 2-butoxy ethanol which is commercially sold under the trademark butyl Cellosolve.

The solvent is used in the composition at a level of at least 25 parts by weight based on 100 parts by weight of the polymer. When less than 25 parts of solvent is used with 100 parts by weight of polymer, the product composition is typically unstable and exhibits two phases. More preferably, the solvent is used in the range of about 50 to about 500 parts by weight based on 100 parts by weight of the polymer. The upper amount of solvent used is limited basically by the practical feasibility of the process. Excellent compositions were obtained when employing about 100 parts by weight of the solvent per 100 parts by weight of the carboxyl-containing liquid polymer.

The third essential ingredient of the composition is a base which has a $pk_a$ value of greater than 7. Such bases can be inorganic or organic bases. Examples of inorganic bases are sodium hydroxide, potassium hydroxide, and metal alcoholates such as sodium ethoxide. More preferably the base is an organic amine, preferably a tertiary amine. Examples of these amines are trimethylamine, triethylamine, triisopropyl amine, dimethylbutyl amine, dimethylbenzyl amine, methyldiphenyl amine, triethanol amine, N-methyl peperidine, N-methyl morpholine, triethylenediamine, pyridine, 4,4'-dipyridyl propane, 2,4,6-tri (dimethylaminomethyl) phenol, and the like. Excellent results were obtained when the organic acid base used was dimethylaminoethanol.

The amount of organic base employed is determined by the stoichiometry relationship of the base per 1.0 carboxyl equivalent. The carboxyl equivalent weight is defined as 100 divided by the equivalents per hundred rubber of the carboxyl-containing polymer. The carboxyl-containing polymer can be solubilized using as low as about 0.8 equivalents of base per 1.0 carboxyl equivalent. However, better dispersion is obtained at a level of about 1.0 equivalent of base per 1.0 carboxyl equivalent, although up to a 20% excess can be readily employed without problems. The upper level of base used is basically limited by feasibility and cost.

Water is the fourth essential ingredient in the composition. The water used can be distilled water, demineralized water, or regular tap water. The amount of water used in the solution is in the range of from about 50 parts to about 750 parts by weight per 100 parts by weight of the polymer. More preferably, the amount of water employed is from about 100 parts to about 600 parts of water per 100 parts of the polymer. Excellent results were obtained using about 500 parts by weight of water per 100 parts by weight of carboxyl-containing liquid polymer.

The composition of the water-dispersed, carboxyl-containing liquid polymer is readily prepared by first dissolving the liquid polymer in the solvent. This can be readily done at ambient temperature or with mild heating in a vessel. The dissolution of the polymer in the organic solvent is enhanced by mild agitation with, for example, a propeller type mixer operating at about 50 to about 300 rpm. Thereafter, the base is added to the solvent solution of the liquid polymer. Finally, the water is added slowly with mild agitation to yield a stable suspension of the liquid polymer in the water. No soap is used to prepare the water-dispersed compositions.

The compositions of the invention containing the water-dispersed carboxyl-containing polymer can be readily used as a component in castable elastomeric systems, as an impact modifier for water-borne epoxy and polyester resins and coatings, and other applications.

The following examples illustrate the invention described herein. The examples are not to be construed as limiting in any way the scope of the invention disclosed herein.

EXAMPLE 1

Carboxyl-terminated liquid polymers commercially available from The B.F. Goodrich Company marketed as Hycar®CTBN were used to prepare water-dispersed, carboxyl-containing liquid polymer compositions of this invention.

The compositions were prepared by dissolving the CTBN liquid polymer in the solvent, butyl cellosolve, at a temperature of about 25° C. followed by addition of the respective base. Water was then slowly added to the compositions while agitating the mixture at 50-300 rpm using an air stirrer with a marine blade. The CTBN polymers are described as follows: CT-RLP-1 has a backbone of interpolymerized units of butadiene and acrylonitrile (about 10% by weight), a Brookfield viscosity of 60,000 cps. at 27° C., and a carboxyl equivalent weight of about 2000; CT-RLP-2 has a backbone of interpolymerized butadiene and acrylonitrile (about 18% by weight), a viscosity of 135,000 cps., and a carboxyl equivalent weight of 1920; and CT-RLP-3 has a backbone of interpolymerized butadiene and acrylonitrile (26% by weight), a viscosity of 500,000 cps., and a carboxyl equivalent weight of 1750. The organic base was used in the example at 1.0 equivalent per 1.0 carboxyl equivalent. The components used in the recipes below are shown in parts by weight.

|  | 1 | 2 | 3 | 4 | 5 | 6 |
|---|---|---|---|---|---|---|
| CT-RLP-1 | 20 | — | — | — | — | — |
| CT-RLP-2 | — | 20 | — | 20 | 20 | 20 |
| CT-RLP-3 | — | — | 20 | — | — | — |
| Butyl Cellosolve | 20 | 20 | 2 | 2 | 2 | 2 |
| Dimethylaminoethanol | 1 | 1 | 1 | — | — | — |
| Imidazole | — | — | — | 0.7 | — | — |
| 2-Methyl Imidazole | — | — | — | — | 0.8 | — |
| 2-Methyl-4-Ethyl Imidazole | — | — | — | — | — | 1.1 |
| Water | 100 | 100 | 100 | 100 | 100 | 100 |

All of the compositions were stable and translucent.

EXAMPLE 2

The experiment in Example 1 above was essentially repeated using a carboxyl-terminated polymer having a polymeric backbone comprised of interpolymerized butadiene. The polymer has a viscosity of 60,000 cps. and a carboxyl equivalent weight of 2220. The recipe used was 20 parts by weight of polymer, 20 parts by weight of butyl cellusolve, 1 part by weight of dimethylaminoethanol and 100 parts by weight of water. A stable, translucent composition was readily prepared.

EXAMPLE 3

The above experiment was essentially repeated using a carboxyl-containing polymer having a polymeric backbone comprised of interpolymerized units of butadiene, acrylonitrile (about 18% by weight), and acrylic acid (1.7% by weight). The polymer has both terminal and pendant carboxyl groups. The polymer has an average molecular weight of about 3600, a viscosity of about 160,000 centipoises at 27° C., and a carboxyl equivalent weight of about 1490. The recipe used was 20 parts by weight of polymer, 20 parts by of butyl cellusolve, 1 part by weight of dimethylamino-ethanol and 100 parts by weight of water. A stable, translucent composition was readily prepared.

I claim:

1. A water-dispersed toughening agent composition for castable elastomeric systems, said composition containing (1) 100 parts by weight of a carboxyl-containing liquid polymer, (2) at least 25 parts by weight of an organic solvent which is both water and organic soluble and has a normal boiling point above about 100° C., (3) at least about 0.8 equivalent of a base for each 1.0 carboxyl equivalent, said base having a p$k_a$ value of greater than about 7, and (4) from about 50 to about 750 parts by weight of water.

2. A composition of claim 1 wherein the carboxyl-containing liquid polymer is an carboxyl-terminated liquid polymer having an average molecular weight from about 200 to about 10,000.

3. A composition of claim 2 wherein the carboxyl-terminated liquid polymer has a polymeric backbone comprised of interpolymerized units of from about 50% to about 99.6% by weight of a diene, up to about 40% by weight of a vinyl nitrite or vinyl aromatic, and up to about 10% by weight of a vinyl acid and has a carboxyl content of from about 0.4% to about 10% by weight, all weights based upon the weight of the polymer.

4. A composition of claim 1 wherein the solvent is present in from about 100 to about 500 parts by weight based on 100 parts by weight of the polyment.

5. A composition of claim 4 wherein the solvent is 2-butoxyethanol.

6. A composition of claim 1 wherein the base is an organic amine employed at about 1.0 equivalent of base for every 1.0 carboxyl equivalent.

7. A composition of claim 6 wherein the base is a tertiary amine.

8. A composition of claim 6 wherein the base is selected from the group consisting of dimethylaminoethanol, imidazole, 2-methyl imidazole, and 2-methyl-4-ethyl imidazole.

* * * * *